United States Patent Office 2,966,453
Patented Dec. 27, 1960

2,966,453

OXIDATION OF MERCAPTO COMPOUNDS

William K. T. Gleim, Island Lake, and Peter Urban, Northbrook, Ill., assignors to Universal Oil Products Company, Des Plaines, Ill., a corporation of Delaware No Drawing. Filed Mar. 13, 1959, Ser. No. 799,120

13 Claims. (Cl. 208—206)

This invention relates to the oxidation of mercapto compounds and more particularly to a novel method of converting mercapto compounds into disulfides.

The term mercapto compounds is well known to describe the sulfur-containing compounds as hydrogen sulfide and the alkyl and aryl derivatives thereof known as mercaptans. In a primary embodiment of the present invention, the mercapto compounds are contained in hydrocarbon distillates. For example, gasoline containing mercaptans is known as a sour gasoline and must be treated to remove and/or convert the mercapto compounds in order for the gasoline to be used satisfactorily for the purpose. Other hydrocarbon distillates including naphtha, jet fuel, kerosene, diesel fuel, fuel oil, residual oil, etc. also contain mercaptans. In order to meet specifications for the use of these hydrocarbon distillates, it often is necessary to reduce the mercaptan content of the distillate. The present invention also can be used for converting mercapto compounds contained in other organic fractions as, for example, alcohols, ketones, aldehydes, etc.

Another application of the novel process of the present invention is in the regeneration of alkaline solutions which previously had been utilized to remove a major portion of the mercaptans and other acidic compounds contained in hydrocarbon distillates. Preferred alkaline solutions comprise aqueous solutions of sodium hydroxide (caustic) and of potassium hydroxide. Other alkaline solutions include those of lithium hydroxide, rubidium hydroxide and cesium hydroxide. However, for economic reasons, the last mentioned compounds generally are not preferred. The alkaline solution generally is used as an aqueous solution of from about 2 to about 50% weight concentration and, when desired, solutizers, solubilizing agents, etc. are employed including alcohols and particularly methanol, ethanol, etc., phenols, cresols, tannin, butyric acid, etc.

In still another embodiment, the present invention may be used in a combination of both of these steps; that is, the removal of a major portion of the mercaptans by extraction in an alkaline solution, followed by further reduction of the remaining mercaptan content by oxidation to disulfides. For example, a sour cracked gasoline is subjected to extraction with an alkaline solution to remove a major proportion of the mercaptans and the thus partly treated gasoline then is subjected to treatment in the novel method of the present invention to produce a sweet or substantially sweet gasoline by oxidizing all or a major portion of the remaining mercaptans to disulfides. The alkaline solution used in the first step of the process is subjected to regeneration by oxidation in the presence of the novel catalyst of the present invention in order to convert the mercaptides into disulfides and to recover caustic solution for use in extracting additional sour gasoline. It will be noted that this combination serves to remove a major portion of the mercaptans from the gasoline and thus the gasoline will not contain a high concentration of sulfur compounds which are detrimental to the susceptibility of the gasoline to the addition of tetraethyl lead.

In one embodiment the present invention relates to a method of oxidizing a mercapto compound to a disulfide compound which comprises reacting said mercapto compound with an oxidizing agent in the presence of a porphyrin catalyst.

In a specific embodiment the present invention relates to a method of sweetening a sour hydrocarbon distillate which comprises reacting said distillate with air in the presence of cobalt tetraphenylporphin sulfonate.

In another specific embodiment the present invention relates to a method of regenerating used alkaline solution which comprises oxidizing the same in the presence of vanadium tetraphenylporphin carboxylate.

Any suitable porphyrin (also called porphin) catalyst may be used in accordance with the present invention. Preferably a metal porphyrin catalyst is employed. Particularly preferred metal porphyrins are cobalt porphyrin and vanadium porphyrin. Other metal porphyrins include iron porphyrin, manganese porphyrin, chromium porphyrin, magnesium porphyrin, copper porphyrin, nickel porphyrin, zinc porphyrin, titanium porphyrin, hafnium porphyrin, thorium porphyrin, tin porphyrin, lead porphyrin, columbium porphyrin, tantalum porphyrin, antimony porphyrin, bismuth porphyrin, molybdenum porphyrin, palladium porphyrin, platinum porphyrin, silver porphyrin, mercury porphyrin, etc. These specific metal porphyrins are set forth for illustrative purposes and not with the intention of unduly limiting the present invention thereto. It is understood that any suitable metal porphyrin may be employed and that, when desired, a mixture of metal porphyrins may be utilized. Furthermore, the various metal porphyrins are not necessarily equivalent. The particular metal porphyrin to be used will depend upon its solubility and effectiveness in the particular hydrocarbon distillate being treated.

In general the metal porphyrins are not readily soluble in aqueous solutions or alkaline solutions and, therefore, for improved operation it is preferable to utilize a derivative thereof. One suitable method for increasing solubility of metal porphyrins is to prepare sulfonated derivatives. The sulfonated derivatives may be prepared in any suitable manner as, for example, by reacting the metal porphyrin with oleum or other suitable sulfonating agent. The mono-, di-, tri- or tetra sulfonate will be prepared, depending upon the solubility of the particular sulfonate in the specific solution in which it is to be dissolved and in the specific hydrocarbon distillate being treated. In other words, the porphyrin compound should be soluble in the solution in which it is to be used as, for example, aqueous caustic solution, to an extent sufficient to incorporate the desired amount of catalyst in the solution, but the porphyrin compound must not be soluble in the hydrocarbon distillate being treated. The latter is important in order to avoid loss of catalyst from the treating solution and in order to avoid the inclusion of the metal compound in the hydrocarbon distillate. As hereinbefore set forth, the degree of sulfonation will be correlated with the soluble properties. In some preparations a mixture of the sulfonates is formed and such mixture is used in accordance with the present invention.

While the sulfonic acid derivatives are preferred, it is understood that other suitable derivatives may be employed. For example, the carboxylated derivatives may be utilized. These may be prepared in any suitable manner as, for example, by the action of trichloroacetic acid on the metal porphyrin or by the action of phosgene and aluminum chloride. In the latter reaction, the acid chloride is formed and it is converted to the carboxylate derivative by conventional hydrolysis.

In still another embodiment, the porphyrin preferably is substituted with one or more hydrocarbon groups, which may be attached to the pyrrole rings and/or the carbon atoms connecting such rings. In one embodiment the hydrocarbon substituent comprises phenyl groups. For example, tetraphenylporphyrin is readily prepared in essentially chemically pure state, detailed preparation thereof being hereinafter set forth. Other hydrocarbon substituents include alkyl, alkenyl, aralkyl cycloalkyl, alkcycloalkyl, cycloalkalkyl, etc. In some cases the hydrocarbon substituent or substituents may contain non-hydrocarbon groups including oxygen, nitrogen, sulfur, phosphorus, etc.

The following are illustrative examples of typical substituted porphyrin compounds. It is understood that these are set forth solely as typical illustrations and that other suitably substituted porphyrin compounds may be employed. Illustrative compounds include cobalt tetraphenylporphyrin, vanadium tetrabenzporphin, cobalt 1,4,5,8-tetramethylporphin, vanadium 1,4,5,8-tetraethylporphin, cobalt 1,5-dimethyl-4,8-dipropylporphin, vanadium 1,5-diethyl-4,8-dibutylporphin, etc. The specific compounds set forth above comprise those in which the substituents are attached to the pyrrole rings. Either alone or in addition to such substitutions, the carbon atoms connecting the rings may contain hydrocarbon groups. Illustrative compounds in this class include cobalt alpha,beta,gamma,delta-tetraphenylporphin, vanadium alpha,beta,gamma,delta-tetratolylporphin, cobalt alpha,gamma-dihexylporphin, vanadium alpha,beta,gamma-trioctylporphin, etc. As stated above, both the connecting carbon atoms and the pyrrole rings may contain hydrocarbon substituents. It is understood that the number and positions of the substituent groups may be different from those specifically set forth above and that these groups may be selected from those containing from 1 to 30 or more carbon atoms each. In some cases, a mixture of alkyl, aryl and/or other substituents may be employed, each substituent containing up to 30 or more carbon atoms each.

Illustrative examples of sulfonated derivatives containing hydrocarbon substituents include cobalt tetraphenylporphin monosulfonate, cobalt tetraphenylporphin disulfonate, cobalt tetraphenylporphin trisulfonate, cobalt tetraphenylporphin tetrasulfonate, etc., vanadium tetrabenzporphin monosulfonate, vanadium tetrabenzporphin disulfonate, vanadium tetrabenzporphin trisulfonate, vanadium tetrabenzporphin tetrasulfonate, cobalt 1,5-dipropylporphin-4,8-disulfonate, vanadium 1,5,8-triethylporphin 4,6-disulfonate, cobalt alpha,gamma-diphenylporphin-1,5-disulfonate, vanadium alpha,beta,gamma,delta-tetraphenylporphin-1,4,5-trisulfonate, cobalt 1,5-dipropyl-alpha, beta,gamma,delta - tetraphenylporphin-4,8-disulfonate, vanadium 4,8-dihexyl-alpha,beta,gamma, delta-tetratolylporphin-1,5-disulfonate, etc.

Illustrative examples of carboxylated derivatives containing hydrocarbon substituents include cobalt tetraphenylporphin monocarboxylate, cobalt tetraphenylporphin dicarboxylate, cobalt tetraphenylporphin tricarboxylate, cobalt tetraphenylporphin tetracarboxylate, etc., vanadium tetrabenzporphin monocarboxylate, vanadium tetrabenzporphin dicarboxylate, vanadium tetrabenzporphin tricarboxylate, vanadium tetrabenzporphin tetracarboxylate, cobalt 1,5-dipropylporphin-4,8-dicarboxylate, vanadium 1,5,8-triethylporphin-4,6-dicarboxylate, cobalt alpha,gamma-diphenylporphin-1,5-dicarboxylate, vanadium alpha,beta,gamma,delta-tetraphenylporphin-1,4,5-tricarboxylate, cobalt 1,5-dipropyl-alpha,beta, gamma,delta-tetraphenylporphin-4,8-dicarboxylate, vanadium 4,8 - dihexyl-alpha,beta,gamma,delta-tetratolylporphin-1,5-dicarboxylate, etc.

It is understood that the specific compounds hereinabove set forth are illustrative typical compounds and that differently substituted compounds also may be employed in accordance with the present invention, as well as mixtures of these different compounds. For example, the sulfonated derivatives may comprise a mixture of the mono- and disulfonates, a mixture of the di- and trisulfonates, etc. As hereinbefore set forth, these are not necessarily equivalent but will be selected with regard to solubility and effectiveness in the particular use.

In still another embodiment of the present invention, the azo porphyrins may be employed and these may be substituted in substantially the same manner as herein described for the porphyrin compounds. In still another embodiment the porphyrin compounds may be prepared from chlorophyll by saponifying it and, when desired, replacing the magnesium with cobalt, vanadium or other metal as hereinbefore set forth. In still another embodiment the porphyrin compounds may comprise hemin and preferably hemin in which the iron component is replaced with cobalt or vanadium.

While the porphyrin catalyst may be utilized as such, in another embodiment of the invention it may be employed in association with a solid carrier. In some cases the carrier also may exert a catalyst effect and in such cases the combined effect will be greater than obtained by either component alone. In still other cases the carrier may serve merely as a means of dispersing the active catalyst component and to extent the available surface. Any suitable carrier may be employed and preferably comprises carbon. A particularly preferred carbon carrier is charcoal. Any suitable charcoal may be employed. Illustrative charcoals include bone charcoal, wood charcoal, charcoal made from cocoanut or other nut shells, fruit pits, etc. The charcoal or other carbon carrier may be formed into any suitable shape including spheres, cylinders, rectangles, squares, saddles, rings, etc. or may be used as granules of irregular size and shape.

The metal porphyrin compound may be composited with the carrier in any suitable manner. In one method the metal porphyrin may be dissolved in any suitable solvent and the solid carrier soaked, suspended, immersed or otherwise contacted therewith. In another method the solution of porphyrin compound may be sprayed onto or otherwise contacted with the solid carrier. A preferred solvent for this purpose comprises an alcohol and particularly methanol. Other solvents include ethanol, propanol, butanol, etc., acetone, methylethyl ketone, etc., dimethyl ether, diethyl ether, etc. In some cases a satisfactory solution may be prepared in water.

Treatment of the hydrocarbon distillate preferably is effected in the presence of an alkaline reagent, which is selected from those hereinbefore set forth. Conveniently, the porphyrin catalyst is soluble in the alkaline solution and is incorporated therein and utilized in this manner for effecting oxidation of the mercapto compounds. In other cases the porphyrin catalyst will be soluble in water to a satisfactory extent and may be used as a solution therein for effecting the desired oxidation of the mercapto compounds. In some cases it may be desirable to have a trace of alkaline material present in the treating zone. In still other cases a solution of the porphyrin catalyst may be prepared in aqueous ammonium hydroxide. It is understood that any suitable solution may be prepared and used in accordance with the present invention.

The porphyrin catalyst is very active and stable. Because of its high activity the catalyst is used in exceedingly small concentrations. These may range from 5 to 1000 and preferably from 10 to 100 parts per million by weight of the active alkaline reagent in the alkaline solution, when employed, or from about 10 to 10,000 parts per million of the aqueous or other non-alkaline solvent when employed. The use of higher concentrations are unnecessary in most cases but may be employed, if desired, and thus may range up to 25% or more by weight.

As hereinbefore set forth, treating of the sour hydrocarbon distillate is effected by oxidation of mercaptans. Accordingly, an oxidizing agent is present in the reaction. Air is preferred, although oxygen or other oxygen-containing gases may be used. In some cases the sour petroleum distillate may contain entrained oxygen or air in sufficient concentration to accomplish the desired treating, but generally it is preferred to introduce air into the reaction. The amount of air must be sufficient to effect oxidation of the mercaptans, although a moderate excess of air generally is not objectionable.

Treating of the petroleum distillate may be effected in any suitable manner and may be in a batch or continuous process. In a batch process the sour hydrocarbon distillate is introduced into a reaction zone containing the porphyrin catalyst, and air is introduced therein or passed therethrough. Preferably the reaction zone is equipped with suitable stirrers or other mixing devices to obtain intimate contact. A continuous process will depend upon whether the catalyst is dissolved or carried in the solvent or is used as a fixed bed. In the former method, the solvent containing the catalyst is passed countercurrently to or cocurrently with the sour petroleum distillate in the presence of a continuous stream of air. In another embodiment, the reaction zone contains the solvent and porphyrin catalyst, and the hydrocarbon distillate and air are continuously passed therethrough and removed, generally from the upper portion of the reaction zone. When the catalyst is used as a fixed bed, the hydrocarbon distillate and air are passed therethrough in either upward or downward flow.

In general the treating reaction is effected at ambient temperature. In some cases elevated temperature will be employed and generally will be within the range of 100° to about 400° F. or more, depending upon the pressure utilized therein, but usually below that at which substantial vaporization occurs. Atmospheric pressure or superatmospheric pressure up to 1000 pounds per square inch or more may be employed.

When used for the regeneration of alkaline reagent, the regeneration may be effected in any suitable manner and either in batch or continuous operation. In a continuous process, for example, the used alkaline reagent is continuously supplied to a regeneration zone containing the porphyrin catalyst and/or to which the porphyrin catalyst is continuously or intermittently introduced. Air, oxygen or other oxidizing gas is supplied to the regeneration zone. The regeneration may be effected at ambient temperature or at elevated temperature which generally which generally will not exceed about 220° F. In the regeneration, mercaptans are oxidized to disulfides. Depending upon the particular operation employed, the caustic solution containing disulfides are removed, either from the upper or lower portion of the regeneration zone, and sent to a disulfide separator. The disulfides are withdrawn as an upper layer from the settler, and the regenerated caustic solution is recycled within the process for further use in extracting mercaptans from sour hydrocarbon distillate. When the porphyrin catalyst is composited with a support, the regenerated caustic solution containing the catalyst may be separated in any suitable manner including filtration, settling or otherwise to remove the solid material prior to recycling of the caustic solution. In still other cases, the catalyst may be composited with a solid support and used as a fixed bed in the regeneration zone.

The following examples are introduced to illustrate further the novelty and utility of the present invention but not with the intention of unduly limiting the same.

Example I

The catalyst of this example is cobalt alpha,beta,gamma,delta-tetraphenylporphin sulfonate and is prepared as follows: Tetraphenylporphin is first prepared by forming a mixture of 100 ml. of pyrrole, 200 ml. of benzaldehyde and 200 ml. of pyridine, and pouring the mixture into a glass liner, which then is inserted into a one liter autoclave bomb. 100 ml. of pyridine are supplied to the annular space between the glass liner and the bomb. Air is evacuated from the bomb, and the bomb then is heated to 360° F. for 48 hours and allowed to cool slowly in the autoclave for 24 hours. The contents of the glass liner are filtered and washed with a mixture of 90% ether and 10% acetone until the filtrate is a light pink color. The crystals are washed with hot methanol and dried in a vacuum oven. Crude tetraphenylporphyrin is recovered in an average yield of about 17 grams. The crude crystals are purified by extraction with 200 ml. of benzene, the crystals recovered by filtration and further purified by recrystallization. The dry crystals are essentially chemically pure tetraphenylporphyrin and correspond substantially to the theoretical analysis for carbon, hydrogen and nitrogen.

Cobalt tetraphenylporphin is prepared as follows: 5 grams of the tetraphenylporphin prepared in the above manner are dissolved in 300 ml. of pyridine. 5 grams of cobalt acetate are dissolved in 200 ml. of pyridine. These solutions are mixed, deaerated and poured into a glass liner of a one liter autoclave bomb. 100 ml. of pyridine are placed in the annular space between the glass liner and the bomb. The bomb is pressured to 300 pounds per square inch with nitrogen, heated to 400° F. for 24 hours. The bomb then is allowed to cool to room temperature for 24 hours, and the contents are removed and distilled under reduced pressure to reduce the liquid volume to 50%. After cooling to room temperature, the crystals are filtered and purified by extraction with benzene. About 5 grams of chemically pure cobalt tetraphenylporphin are obtained. Here again the cobalt tetraphenylporphin is analyzed and found to correspond substantially to the theoretical analysis for carbon, hydrogen, nitrogen and cobalt.

The above describes small scale preparations of the cobalt tetraphenylporphin. A larger scale preparation is made in substantially the same manner by utilizing larger quantities of reactants and larger size plant equipment. From a large scale preparation, 150 grams of cobalt tetraphenylporphin are used to prepare the sulfonate derivative. 150 grams of cobalt alpha,beta,gamma,delta-tetraphenylporphin are mixed with 1200 grams of oleum (26%) and stirred and heated to 60° C. for 12 hours. In this preparation an excess of sulfuric acid is used and, following the reaction, the reaction mixture is cooled in a mixture of salt water and ice to dilute the excess sulfuric acid to below about 20% concentration. The reaction mixture then is filtered and the precipitate is recovered as purple colored crystals. These crystals are cobalt alpha,beta,gamma,delta-tetraphenylporphin sulfonate. The catalyst is a mixed sulfonate product containing the disulfonate.

Example II

The gasoline used in this example is a cracked gasoline having a mercaptan sulfur content of 0.005% by weight. It is subjected to sweetening by being passed in contact with 10° Baumé caustic solution containing 70 parts per million of cobalt alpha,beta,gamma,delta-tetraphenyl-porphin sulfonate based on the active NaOH content of the caustic solution. On the basis of treating 5000 barrels per day of cracked gasoline in a continuous process, 50 barrels of caustic solution are used and air is introduced at the rate of 50 cubic feet per hour into the sweetening zone. In order to effect intimate contact in the sweetening zone, the caustic solution containing the porphyrin catalyst is introduced into the upper portion of the sweetening zone through a suitable spray arrangement. Similarly, the air is introduced into the lower portion of the sweetening zone through a suitable spray arrangement, and the sour gasoline is introduced at an intermediate point or at the lower point into the sweetening zone. The sweetening is effected at ambient temperature, and the treated gasoline withdrawn from the sweetening zone is doctor sweet.

*Example III*

Sour kerosene containing 0.15% by weight of mercaptan sulfur is treated in a batch type process with 20% potassium hydroxide aqueous solution containing 80 parts per million, based on the KOH content of the potassium hydroxide solution, of cobalt alpha,beta,gamma,delta-tetraphenylporphin sulfonate prepared as described in Example I. The potassium hydroxide solution containing the porphin catalyst, sour kerosene and air are charged into the reaction zone and are intimately mixed therein by means of stirring blades. The treating is effected at ambient temperature. The mercaptan sulfur content of the kerosene treated in the above manner is reduced to below 0.01% by weight, which is satisfactory for the specific use of this kerosene. When further reduction in sulfur content is desired, the time of contact is increased accordingly.

*Example IV*

This example describes a combination extraction, caustic regeneration and final sweetening process using a cobalt alpha,beta,gamma,delta-tetraphenylporphin sulfonate catalyst prepared in the manner as described in Example I. The gasoline used in this example is a cracked gasoline having a total sulfur content of 0.1% by weight and a mercaptan sulfur content of 0.05% by weight. The gasoline is treated with a refinery caustic solution of about 12° Baumé, into which 60 parts per million by weight of the porphyrin catalyst has been incorporated. The gasoline is introduced into the lower portion of the extraction zone and the caustic solution containing porphyrin catalyst is introduced into the upper portion of the extraction zone. The partly treated gasoline is withdrawn from the upper portion of the treating zone but still has a mercaptan sulfur content of 0.012% by weight. The caustic solution containing the porphyrin catalyst is withdrawn from the lower portion of the extraction zone and is sent to a regeneration zone, whereto air is introduced at a rate of 600 cc. per hour. Both the extraction and regeneration are effected at substantially ambient temperature and pressure. Because of the presence of the porphyrin catalyst, the caustic solution is regenerated by oxidation. Excess air is removed from the upper portion of the regeneration done, while the regenerated caustic solution containing disulfides is withdrawn from the lower portion of the regeneration zone and is sent to a settling zone. In the settling zone an upper layer of disulfides separates and is withdrawn. The regenerated caustic solution is recycled to the extraction zone for further use in extracting mercaptans and other acidic components from cracked gasoline.

The partly treated gasoline from the extraction zone is sent to a final treating zone. Caustic solution of substantially the same concentration and containing 60 parts per million of the porphyrin catalyst is prepared and is commingled with the partly treated gasoline and passed into a final treating zone, to which air is passed at a rate of 60 cc. per hour. After several days of operation, additional porphyrin catalyst is introduced into the circulating caustic solution. Generally the additional porphyrin catalyst will be supplied at a concentration of about 30 parts per million and at a time interval of from about 1 to 3 days. It will be noted that, even with the added porphyrin catalyst, the total amount of catalyst used is extremely low.

The gasoline withdrawn from the final treater is doctor sweet and now is sent to storage for further distribution as desired.

*Example V*

The catalyst of this example is vanadium porphin carboxylate prepared by reacting vanadium porphin with trichloroacetic acid. The product is a mixed carboxylate containing the dicarboxylate.

The catalyst prepared in the above manner is utilized to treat sour kerosene having a mercaptan content of 0.25% by weight. The vanadium porphin carboxylate is commingled, in a concentration of 80 parts per million, with 20° Baumé potassium hydroxide aqueous solution. The resulting mixture, the sour kerosene and air are passed upwardly through a treating zone containing orifice mixers. The treating is effected at a temperature of 110° F. and a pressure of 30 pounds per square inch gauge. The mercaptan content of the gasoline is reduced from 0.25% to less than 0.02% by weight. The kerosene is blended with substantially sweet kerosene obtained in other processes at the refinery and the total blend more than meets the required sulfur specifications of the kerosene being marketed.

We claim as our invention:

1. A method of oxidizing a mercapto compound to a disulfide compound which comprises reacting said mercapto compound with an oxidizing agent in the presence of a porphyrin catalyst.

2. A method of treating a sour hydrocarbon distillate which comprises reacting mercaptans contained in said distillate with air in the presence of a porphyrin catalyst.

3. A method of treating a sour hydrocarbon distillate which comprises reacting mercaptans contained in said distillate with air in the presence of an alkaline reagent and a cobalt porphin sulfonate catalyst.

4. A method of treating a sour hydrocarbon distillate which comprises reacting mercaptans contained in said distillate with air in the presence of an alkaline reagent and a vanadium porphin sulfonate catalyst.

5. A method of treating a sour hydrocarbon distillate which comprises reacting mercaptans contained in said distillate with air in the presence of an alkaline reagent and a cobalt porphin carboxylate catalyst.

6. A method of treating a sour hydrocarbon distillate which comprises reacting mercaptans contained in said distillate with air in the presence of an alkaline reagent and a vanadium porphin carboxylate catalyst.

7. A method of sweetening a sour gasoline which comprises reacting mercaptans contained in said gasoline with air in the presence of caustic solution and cobalt tetraphenylporphin sulfonate catalyst.

8. A method of sweetening a sour gasoline which comprises reacting mercaptans contained in said gasoline with air in the presence of caustic solution and vanadium tetraphenylporphin sulfonate catalyst.

9. A method of regenerating a used alkaline reagent containing a mercapto compound which comprises reacting the same with an oxidizing agent in the presence of a porphyrin catalyst.

10. A method of regenerating a caustic solution previously used for the removal of acidic components from hydrocarbon distillate, which comprises reacting mercapto compounds contained in said caustic solution with air in the presence of a cobalt porphin sulfonate catalyst.

11. A method of regenerating a caustic solution previously used for the removal of acidic components from hydrocarbon distillate, which comprises reacting mercapto compounds contained in said caustic solution with air in the presence of a vanadium porphin sulfonate catalyst.

12. A method of regenerating a caustic solution previously used for the removal of acidic components from hydrocarbon distillate, which comprises reacting mercapto compounds contained in said caustic solution with air in the presence of a cobalt porphin carboxylate catalyst.

13. A method of regenerating a caustic solution previously used for the removal of acidic components from hydrocarbon distillate, which comprises reacting mercapto compounds contained in said caustic solution with air in the presence of a vanadium porphin carboxylate catalyst.

References Cited in the file of this patent

UNITED STATES PATENTS

| | | |
|---|---|---|
| 2,565,349 | Browder et al. | Aug. 21, 1951 |
| 2,671,048 | Rosenwald | Mar. 2, 1954 |
| 2,744,854 | Urban | May 8, 1956 |
| 2,823,173 | Gislon et al. | Feb. 11, 1958 |